FLOATING-POINT COMPUTER

Filed Jan. 26, 1959 4 Sheets-Sheet 1

INVENTORS
JOHN C. ALRICH
DAVID H. HARTKE
BY Christie, Parker & Hale
ATTORNEYS

Feb. 20, 1962 J. C. ALRICH ETAL 3,022,006

FLOATING-POINT COMPUTER

Filed Jan. 26, 1959 4 Sheets-Sheet 2

INVENTORS
JOHN C. ALRICH
DAVID H. HARTKE
BY
Christie, Parker & Hale
ATTORNEYS

Feb. 20, 1962 J. C. ALRICH ETAL 3,022,006

FLOATING-POINT COMPUTER

Filed Jan. 26, 1959 4 Sheets-Sheet 3

INVENTORS
JOHN C. ALRICH
DAVID H. HARTKE

BY Christie, Parker & Hale
ATTORNEYS

INVENTORS
JOHN C. ALRICH
DAVID H HARTKE
BY Christie, Parker & Hale
ATTORNEYS

United States Patent Office 3,022,006
Patented Feb. 20, 1962

3,022,006

FLOATING-POINT COMPUTER

John C. Alrich, Altadena, and David H. Hartke, Glendora, Calif., assignors to Burroughs Corporation, Detroit, Mich., a corporation of Michigan Filed Jan. 26, 1959, Ser. No. 788,901
8 Claims. (Cl. 235—160)

This invention relates to floating-point digital computers, and more particularly, is concerned with a circuit for providing selective precision for each floating-point algebraic addition.

Generally digital computers are arranged so that the decimal point in a number (or word, as it is generally referred to) has a fixed physical location; for example, at the left of the most significant digit location in the word. Such computers are referred to as fixed point computers. However, in certain scientific computations involving many multiplications and divisions where the magnitudes or quantities are likely to vary widely, it has been found more desirable to use a floating-point type of notation in which significant zeros are carried as the exponent of the radix and the point is understood to be always in the same place in the remaining digits, such as to the left of the highest order non-zero digit. Examples of different formats used in computers employing floating-point notation is given in the book Arithmetic Operations and Digital Computers by R. K. Richards, D. Van Nostrand Co., 1955, page 21.

The preferred format for floating-point notation assumes the point to be several orders to the left of the most significant digit; for example, 50 orders to the left. This provides a large range of exponents without concern for the sign of the exponent. The preferred format for a decimal system of notation for floating-point operation may be as follows:

$$+1.234=+.1234\times 10^{1}=0\text{–}51\text{–}12340000$$
$$-1.234=-.1234\times 10^{1}=1\text{–}51\text{–}12340000$$
$$+0.001234=+.1234\times 10^{-2}=0\text{–}48\text{–}12340000$$

In the above notation, the first digit to the left in the word indicates sign, the plug sign being stored as a zero and a minus sign being stored as a one. The next two digits represent the exponent, with 50 representing the zero power of 10. Thus 51 and 48 respectively represent the $10^1$ and $10^{-2}$ as shown. The above represents one typical format for floating-point notation which has been used heretofore and will be followed in the explanation of the preferred embodiment of the present invention. However, it will be understood that a number of other formats are equally valid, such as carrying the exponent digits to the right of the mantissa instead of to the left as indicated, or using a different range of exponent values.

While floating-point notation is particularly useful in multiplication and division, it has the disadvantage that in addition and subtraction the exponents must be made equal by shifting in zeros to one of the mantissas, and the result must be normalized by shifting out significant zeros so as to position the highest order non-zero digit in the selected position to the right of the point and correcting the exponent accordingly.

For example, consider the following typical algebraic addition:

$$+1.345-1.344=0.001$$

In floating-point format, this algebraic addition appears as follows:

$$0511345+1511344=0510001$$

which after normalizing becomes 0471000. It will be evident from the above example of algebraic addition in floating-point notation that although four significant digits were present in both operands, after their difference is taken and the result is normalized there remains only one significant digit in the mantissa. This results from the normalization process in which the answer is shifted three places to the left to return it to the standard floating-point format. In doing so, however, the significant zeros are shifted out.

Heretofore there has been no way for the programmer to detect this loss of precision in using floating-point computation. The present invention provides means by which the precision of the floating-point computations can be continuously monitored. The invention further provides means by which the programmer can determine ahead of time in programming the computer the allowable precision for each floating-point addition or subtraction instruction. This provides the added advantage of being able to establish the desired limits of precision for each arithmetic operation where an extensive series of arithmetic operations are being performed by the computer.

In brief, the present invention provides in an internally programmed computer arranged to execute algebraic addition in floating-point notation, means for counting the number of left-shifts required to normalize the mantissa of the resulting sum and interrupting the computer if the number of left-shifts exceeds a predetermined amount. This predetermined amount is established by a stored digit in the floating-point addition or subtraction instruction. When the instruction is fetched from the computer memory, this "precision" digit is stored in a counter. After the mantissas of the operands are added or subtracted according to the order digits of the instruction, the counter storing the "precision" digit is advanced in synchronism with the left-shift operation necessitated by the normalizing procedure of the answer. The advance of the counter then provides an indication when the number of left-shifts is in excess of the precision desired as established by the "precision" digit, the counter controlling the computer to stop operation before the next instruction is fetched from memory.

For a more complete understanding of the invention, reference should be had to the accompanying drawings, wherein.

Figure 1:
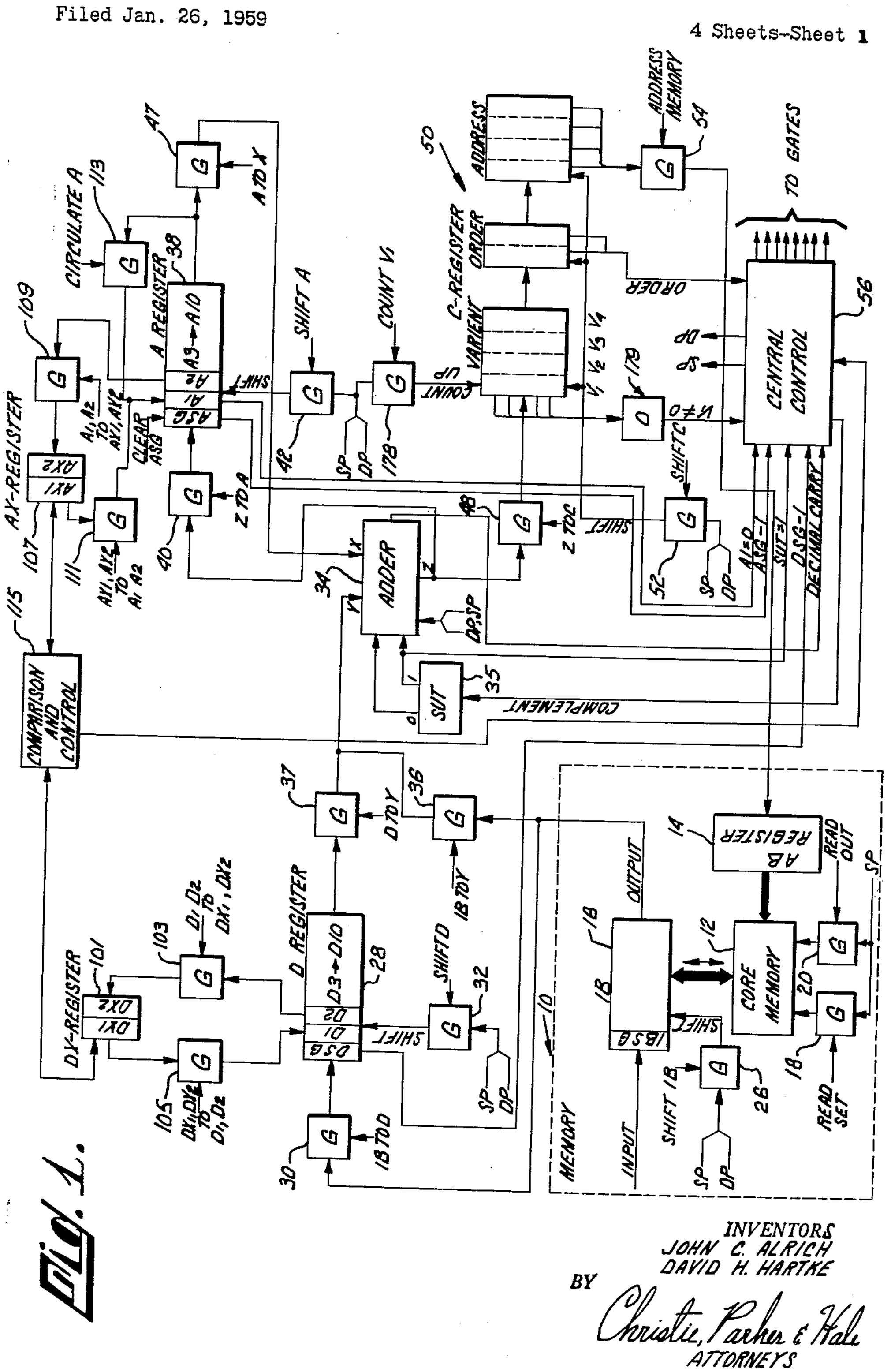
FIG. 1 is a block diagram of the essential components of a computer employing the features of the present invention.

Referring to FIG. 1, there is shown by way of example a block diagram of the essential units of a digital computer of a serial type. While information can be coded in any desired form in the registers of the computer, in the preferred embodiment shown it is assumed that information is represented in a binary-coded decimal form, i.e. in the form of decimal digits represented by four binary bits, preferably according to a 1,2,4,8 code. This is a conventional code and requires four flip-flops to store four bits representing one decimal digit. The four flip-flops which store one digit are referred to as decade. The decade is the basic storage unit for decimal digits, the shifting of a digit into a decade being effected by simultaneously shifting four binary bits into the four flip-flops comprising the decade.

Further, in the computer of FIG. 1, it is assumed that all information is stored in the form of words, the standard word length being ten digits plus a sign digit, which is positioned to the extreme left of the word. Eleven digits comprising a word are circulated serially, i.e. a digit at a time, by transferring simultaneously in parallel the four bits representing a digit from one decade to another.

Words circulated in the computer are generally of two designated types, namely, operands and instructions, or commands, as they are sometimes called. The command words have designated digits which represent the order to be executed, such as the order to execute a floating-point addition or the like. Other designated digits in the command word represent addresses of operands stored in the memory portion of the computer, each command containing the address of the operand to be used in executing the particular command.

With these general principles of operation in mind, reference may be had to the details of FIG. 1, in which the numeral 10 indicates generally the memory portion of the computer in which commands and operands are stored. The memory 10 is preferably of a random access magnetic core type such as described in detail in the book "Digital Computers Components and Circuits" by R. K. Richards, D. Van Nostrand & Co., 1957, chapter 8. The computer memory includes a core memory circuit 12 which comprises a coincidence core matrix circuit and suitable driver and sensing circuits. Associated with the core memory circuit 12 is an address buffer (AB) register 14 and an information buffer (IB) register 16. The AB-register 14 includes four decades, for example, for storing the digits designating an address location in memory, the levels in the flip-flops of the AB-register 14 being used by the core memory circuit 12 to read in or read out a word from the designated location in the core memory.

The IB-register 16 includes eleven decades for temporarily storing one complete word. Information bits can be transferred in parallel from the flip-flops of the eleven decades to a designated memory location or out of a designated memory location in the core memory circuit 12. A pulse applied through a gate 18 may be used to set the core memory circuit 12 to read out information in a designated address location to the IB-register 16. Actual transfer is effected by a pulse passed by a second gate 20 whereby transfer to the IB-register can be synchronized to take place at a particular pulse time.

Once a word is read into the IB-register 16 of memory, it can be read out serially to a number of different locations in the computer. The register 16 includes eleven decades, designated from left to right as IBSG (the sign decade), IB1, IB2, IB3, IB4, IB5, IB6, IB7, IB8, IB9, IB10. Each decade of course comprises four flip-flops for storing the four binary bits representing the stored decimal digit. The four orders of flip-flops in a decade may be designated by the numbers 1, 2, 4, and 8 following the decade designation. For example, the flip-flop in the sign decade of the IB-register storing the lowest order bit is designated IBSG–1, and the highest order bit-storing flip-flop would be designated IBSG–8. This type of notation is used throughout to identify particular decades and flip-flops.

The decades in the IB-register 16 are connected as a shift register. Thus the IB-register 16 is arranged as four conventional shift registers in parallel for shifting out four bits comprising one digit each time a shift pulse is applied to the register, starting with the four bits defining the least significant digit and ending with the sign digit. To shift information out, shift pulses are applied, as required, to the register through a gate 26.

One route of transfer of words from the IB-register 16 is to a D-register 28 which is substantially identical to the register 16. Transfer is controlled by a gate circuit 30 which controls the transfer of the four bits of each digit transferred. Shifting pulses are applied to the D-register 28 through a gate 32. With the gate 30 open, and shifting pulses applied through open gates 26 and 32, digits are transferred serially from the IB-register 16 into the sign decade end of the D-register 28. After eleven shifting pulses, one complete word is transferred from the register 16 to the register 28.

For floating-point computation, an auxiliary register 101, designated DX, is provided for storing the two exponent digits which normally occur in decades D1 and D2 of the D-register. The DX-register therefore includes two decades, DX1 and DX2. Parallel transfer of the exponent digits from D1 and D2 to DX1 and DX2 respectively is effected by a gating circuit 103 and from DX1 and DX2 back to D1 and D2 respectively by a gating circuit 105.

Words may be transferred a digit at a time from either the IB-register 16 or the D-register 28 to the Y-input of an adder circuit 34 having an X-input, a Y-input, and a Z-output, transfer being effected through gate circuits 36 and 37. The adder 34 may be any type of conventional binary-coded decimal adder for producing a binary-coded decimal sum Z, together with a decimal carry, in response to two binary-coded decimal inputs X and Y. See for example the adder described in the British Patent 750,475 published June 13, 1956. The adder is arranged to produce either a sum or difference ($Z=X\pm Y$), depending upon the setting of a flip-flop 35, designated SUT. One pulse is required to establish the decimal sum levels at the Z-output in response to levels established at the X- and Y-inputs.

The output at Z of the adder 34 generally is gated to an accumulator register 38 designated the A-register, the transfer being controlled by a gate 40. The A-register is the same as the IB and D-registers described above. Shifting pulses are applied to the A-register 38 through a gate 42 to shift digits serially through the A-register. The output of the A-register may be coupled to the X-input of the adder 34 by a gate 47.

Figures 2, 3:
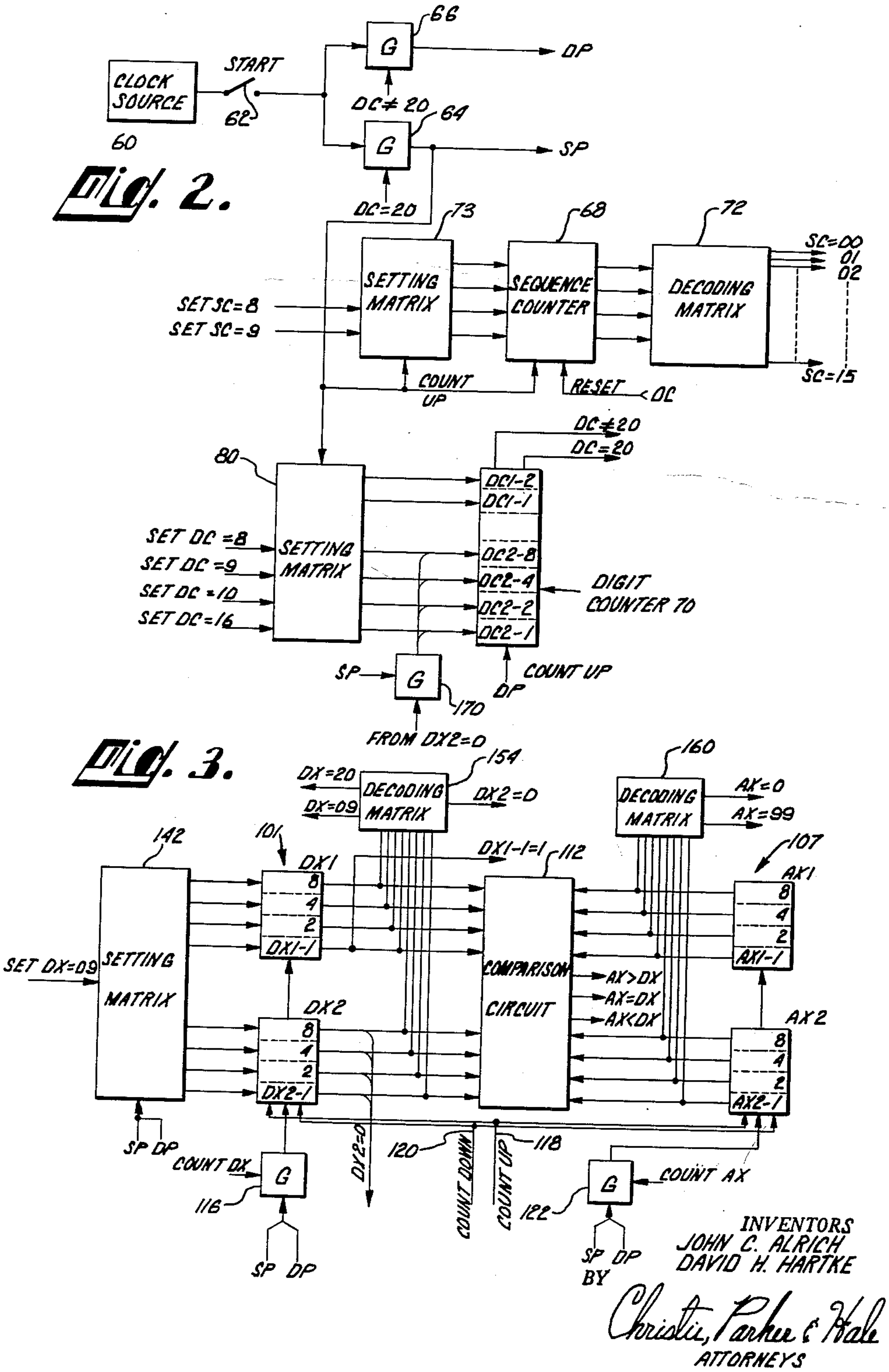
FIG. 2 is a block diagram of the sequencing control portion of the computer of FIG. 1.
FIG. 3 is a detailed block diagram of the comparison and control circuit for the exponent registers in FIG. 1.

For floating-point computations an auxiliary register 107, designated AX, is provided for storing the two exponent digits which normally occur in decades A1 and A2 of the A-register. The AX-register therefore includes two decades, AX1 and AX2. Parallel transfer of the two digits from the decades A1 and A2 to AX1 and AX2 is effected by a gating circuit 109, and from the decades AX1 and AX2 to the decades A1 and A2 by the gating circuit 111. At the same time the A10 decade is connected back to the A1 decade of the A-register through a recirculating gate 113, so that by shifting the A-register, successive digits can be shifted out of the A10 decade and reinserted in the A1 decade. A comparison and control circuit 115, hereinafter described in more detail in connection with FIG. 3, is provided for controlling and comparing the condition of the DX and AX registers.

The Z-output from the adder 34 may also be gated, by means of a gate 48, to the input of a command register 50, designated the C-register and similar to the A-register 38. The C-register is shown with the decades divided into groups according to the format of the instruction words, namely, four variant digits, two order digits, and four address digits. Shifting pulses are applied to the C-register 50 through a gate 52.

As pointed out heretofore, certain of the digits in the command word constitute an address for the operand in memory. These digits are sensed in the first four decades on the right-hand end of the C-register 50, and are transferred in parallel to the AB-register 14 by means of a gating circuit 54.

In operation, the computer fetches one command at a time from memory, the command being transferred into the C-register 50. Once the command is in the C-register 50, it is used to control the subsequent execute operation of the computer according to the order stored in the next two decades of the C-register 50 following the address decades.

The fetch operation involves an operational routine as does the execution of each of the commands. The particular sequence of steps or sub-operations which the computer goes through during a given command or during a fetch operation is uniquely determined by a central control unit 56. The central control unit senses the condition of the two decades in the C-register 50 in which the order digits are stored. It also contains a number of logic toggles, such as an Execute toggle that is set according to whether a fetch operation or an execute operation is to be performed. In response to the information fed into it, the central control circuit 56 sets the many gates in the computer by which the flow of information between the various registers and the adder is effected.

The central control circuit 56, as shown in block from in FIG. 2, includes a clock source 60 with which all operations of the computer are synchronized. Two types of pulses are derived from the clock source 60 when a starting switch 62 is closed, namely, sequence pulses, designated SP, and digit pulses, designated DP. The two types of pulses are derived by means of gates 64 and 66 respectively.

The central control circuit 56 includes two different counters, a sequence counter 68 and a digit counter 70. The sequence counter 68 may be a conventional straight binary counter having, for example, four flip-flop stages for providing sixteen different binary count conditions. A decoder circuit 72 senses the condition of each of the flip-flops in the counter 68 and raises to a high potential level one of sixteen separate output lines according to the count condition of the sequence counter 68. The decoder 72 may be a conventional diode matrix circuit for converting from binary to decimal form. See for example, the above-mentioned book by R. K. Richards, pages 56–60. The sixteen output lines are designated SC=0, SC=1, etc.

The sequence counter 68 is reset to zero at the start of each operation of the computer, such as at the start of a fetch operation or the execution of a command, by an OC pulse generated at the completion of the previous operation. The sequence counter is counted by SP's derived from the clock source 60 through the gate 64.

The sequence counter 68 can also be set to any desired count condition, and count condition 8 and 9 in particular, by a setting matrix circuit 73. The setting matrix is arranged such that when a particular input line, for example, the set SC=8 line, is raised to a high potential level, the next SP, applied to the setting circuit, is transferred to selected flip-flops in the counter 68 for setting the flip-flops in the required condition for energizing the SC=8 line out of the decoding matrix 72. Such technique of setting the flip-flops of a binary counter to any desired count condition is well known.

The digit counter 70 need only count to a maximum of 20. It therefore includes one full decade DC2 with four flip-flops, designated DC2–1, DC2–2, DC2–4, and DC2–8 for the lowest order digit. Since the higher order digit need only go to 2, only two flip-flops are required, namely, DC1–1 and DC1–2. The decade DC2 is arranged to count up as a binary counter in response to DP's from gate 66, the decade producing a carry pulse and being reset to zero after the tenth input pulse. The partial decade DC1 is arranged as a binary counter responsive to the decimal carry pulses from the decade DC2.

The condition of the flip-flop DC1–2 determines whether the count condition is less than 20 or equal to 20 (the counter never exceeds 20). Thus one or the other of the lines DC≠20 and DC=20 connected to the flip-flop DC1–2 is raised to a high level.

The DC=20 output is applied to the gate 64 so that gate 64 is biased open to pass pulses from the clock source 60 to the sequence counter 68 only when the digit counter 70 is in the count 20 condition. The gate 66 is conneected to the DC≠20 line, whereby the gate 66 is biased open whenever the digit counter is in a count condition other than 20. In other words, SP's are generated whenever the digit counter is equal to 20, and DP's are generated whenever the digit counter is not equal to 20.

Figure 4A:
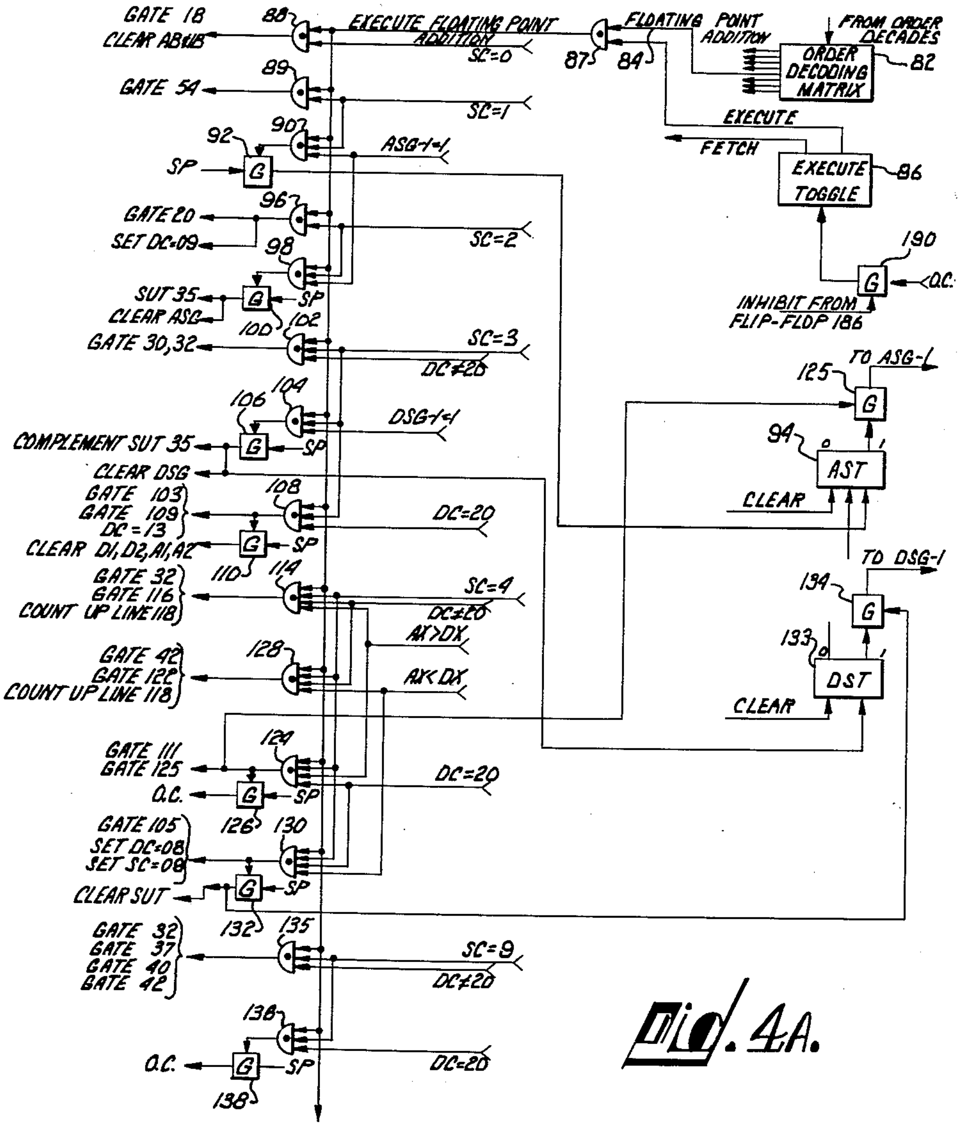
FIGS. 4A and B show the logic circuit which is part of the central control of the computer required to execute a floating-point addition instruction in the computer of FIG. 1.

The output lines of the decoder 72 are applied to a logic circuit which is shown in detail in FIGS. 4A and B. The logic circuit also senses the digits stored in the order portion of the command register 50, the digits in the sign positions of the IB-register 16 and the A-register 38, as well as the state of the SUT flip-flop 35 associated with adder 34 and the presence of a decimal carry from the adder 34.

The logic circuit senses the stepping of the sequence counter 68, and in response to the order being executed as set by the digits in the order portion of the C-register 50, may set the digit counter 70 to any value other than 20 at any step of the sequence counter. This of course interrupts the action of the sequence counter until the digit counter is counted back to 20 by the resulting DP's. Setting of the digit counter is accomplished through a setting circuit 80, which may be a diode matrix circuit for converting from decimal notation to binary notation. The setting circuit 80 also includes gates on each of the lines to the digit counter 70 by means of which each of the flip-flops in the digit counter 70 may be set to correspond to any decimal digit less than 20 in response to an SP applied to the setting circuit 80. Thus by proper design of the logic circuit, any number of DP's can be generated between pairs of SP's for controlling computer operations.

In addition to controlling the sequence of SP's and DP's for each command, the logic circuit controls all the gates in the computer to control the transfer of information among the several registers and the adder. The logic circuit in response to the stepping of the sequence counter 68, provides a series of different gating patterns in carrying out a given command, the patterns for each count condition of the sequence counter 68 being different for each command. At any given setting of the sequence counter 68, the sequence counter of course may be interrupted and a predetermined number of DP's generated, such as for shifting the registers to shift information in the computer.

From the description thus far, it will be apparent that by suitable design of the logic circuit, the computer can be made to carry out a sequence of sub-operations for each command. In copending application Serial No. 788,823 filed January 26, 1959 and assigned to the same assignee as the present invention, the design of the logic circuit for carrying out the fetch operation by which commands are transferred from memory into the command register and the logic circuit for carrying out an addition is described.

The details of the logic circuit forming the floating-point addition instruction or command is shown in detail in FIGS. 4A, B. The two order digits stored in the C-register 50 uniquely determine that a floating-point operation is to be performed between an operand stored in the A-register and an operand stored in memory at the address location determined by the address digits in the instruction stored in the C-register 50. The condition of the flip-flops in the two decades forming the order portion of the C-register 50 are sensed in the logic circuit by an order decoding matrix 82 which is a conventional binary-to-decimal converter by means of which binary coded digits in the two order decades are sensed and caused to energize to a high potential level one of a hundred corresponding output lines. With the order in the command register calling for a floating-point addition operation, an output line 84 is raised to a high level.

The logic circuit also contains an Execute toggle 86 which is complemented at the end of each operation by an operation-complete pulse OC. Under normal operation, the computer alternately performs a fetch operation in which an instruction is fetched from memory to the C-register 50, and an execute operation in which the instruction stored in the C-register is executed. Such operation is described in more detail in the above-identified copending application. Assuming for the moment that the fetch operation has been completed and the floating-point addition instruction has been transferred to the C-register 50, the Execute toggle 86 will have been complemented to the stable state calling for execution of the command.

The condition of the execute toggle 86 and the level of the line 84 from the decoding matrix 82 are sensed by an AND circuit 87, the output of the AND circuit 87 being applied to all the other AND circuits in the logic circuit of FIG. 4 which are related to the floating-point addition operation.

The first operation in carrying out the floating-point addition operation is to transfer the address to memory for selecting the required operand. To this end, an AND circuit 88 senses that the level of the SC=0 line from the sequence counter and the output of the AND circuit 87 are both at a high level. The resulting high level at the output of the AND circuit 88 is used to bias open the gate 18, setting the memory circuit 10 for a read operation. At the same time, the AB and IB registers in the memory 10 are cleared and the sequence counter 68 advanced to the count 1 condition.

At SC=1 time, an AND circuit 89 produces a high level at the output, opening the gate 54 and allowing the address to be transferred from the C-register 50 to the AB-register 14. At the same time, an AND circuit 90 senses the condition of the lowest order flip-flop in the sign decade of the A-register, designated the ASG-1 line, to determine whether a zero or a one, indicating a plus or minus is stored in sign position in the A-register. If a minus sign is stored, the ASG-1 is raised to a high level and the output from the AND circuit 90 opens a gate 92. This passes an SP to set a sign-storing toggle 94, designated the AST. Thus toggle 94 stores the sign information of the operand in the A-register.

The same SP advances the sequence counter to the SC=2 condition which is sensed by an AND circuit 96. The output from the AND circuit 96 opens the gate 20, causing transfer of the addressed operand in the core memory 12 to be transferred to the IB-register 16. At the same time, the digit counter is set to 9 through the setting matrix 73. This provides for the correct number of DP's necessary to shift the operand from the IB-register to the D-register to be generated. Also in response to the SC=2 condition of the sequence counter, an AND circuit 98, in response to a negative sign in the sign decade of the A-register 38 as determined by the level of the ASG-1 line, opens a gate 100 if the sign is negative. This passes the next SP to complement the subtract toggle SUT35 (FIG. 1) and at the same time clear the sign decade ASG of the A-register 38. The same SP advances the sequence counter to the SC=3 condition.

With the digit counter 70 set to 9, the high level of the DC≠20 is sensed by an AND circuit 102. The output of the AND circuit 102 biases open the gates 30 and 32, permitting the output of the IB-register to be shifted to the input of the D-register and the D-register to be shifted by the eleven DP's required to count the digit counter 70 back to its count 20 condition.

After eleven DP's, the digit counter is returned to 20 and the operand is completely shifted from the IB-register to the D-register. At this time an SP is generated by the fact that the gate 64 is again opened and the gate 66 is closed. An AND circuit 98 senses if the sign in the sign decade is minus by means of the DSG-1=1 line from the lowest order flip-flop in the D-sign decade. If a negative sign exists in the operand stored in the D-register, this line will be at a high level which is sensed by the AND circuit 104 during SC=3 time, biasing open a gate 106. This passes the SP generated after the last of the eleven DP's to the complement input of the SUT toggle 35. At this point the SUT toggle 35 can be either in the one (or subtract state), or in the zero (or add state), due to the above condition. If the signs in the sign decade of the A and D registers are alike, then the SUT toggle 35 will have been complemented twice so that it will be in the zero (or add) condition. However, if the signs in the two sign decades are unalike, the SUT toggle 35 will now be in the one (or subtract) condition. At the same time, the SP passed by the gate 106 is used to clear the sign decade DSG of the D-register 28, and to set a toggle 133, designated DST, for storing the minus sign information of the operand word in the D-register.

An AND circuit 108 during SC=3 time senses when the digit counter returns to 20 following the eleven DP's. When the DC=20 line goes high, the output of the AND circuit 108 goes high, opening the gates 103 and 109 for transferring the exponent digits of the two operands respectively to the DX-register 101 and to the AX-register 107. The output from the AND circuit 108 also sets the digit counter to 13 to supply seven DP's necessary to equalize exponents as is required before an addition of the mantissas of the operands can be added. It will be appreciated that in floating-point operation, the exponents of the two operands must be equal before an algebraic addition of the mantissas can be effected.

At the same time, the decades D1 and D2 in the D-register, which originally stored the exponent digits of the one operand, and the A1 and A2 decades of the A-register 38, which stored the exponent digits of the other operand, are cleared. To this end the output of the AND circuit 108 opens the gate 110 for passing the next SP, the output of the gate 110 being used to clear the designated decades. At the same time the sequence counter is advanced to the SC=4 count condition.

During the SC=4 condition of the sequence counter, the exponents of the two operands are equalized and the mantissas in the D-register 28 and the A-register 38 are shifted accordingly. The register whose exponent is largest is left undisturbed. The other register is shifted right as many places as is necessary to align digits of equal weight in corresponding digit positions of the two registers. This is accomplished in the following manner:

Since the AX and DX registers contain both exponents, a comparison is made between the condition of the AX and DX registers. As shown in FIG. 3, the condition of the flip-flops in the two decades of the DX register and the two decades of the AX register are applied to a comparison circuit 112. The comparison circuit is a conventional gating matrix type of circuit by means of which any one of three output lines, designated respectively AX>DX, AX=DN, and AX<DX, is raised to a high potential level depending on the relative magnitude of the two digit numbers stored in the DX and AX registers respectively. For example, if the exponent stored in the AX is larger than the exponent stored in the DX register, then the DX register must be counted up as many times as is necessary to make the exponent in the DX register equal to that in the AX register. At the same time, the D-register 28 must be shifted right each time the DX register is counted up one place. This causes the corresponding digits in the D-register 28 to take the same weight as the digits in the mantissa stored in the A-register. Since there are only eight digits in the mantissa (the remaining three digits of the operand having been devoted to sign and the exponent), a maximum of seven pulses is required to equalize the two exponents. Any greater number would shift the digits in one mantissa completely out of range with relation to the digits of the other mantissa, that is, the entire mantissa that is shifted would be shifted completely out of the register and only zeros would remain. Therefore at the end of the seventh pulse, if the exponents in the AX and DX registers are not equal, the mantissa with the larger exponent is the sum of the two operands to the eight significant places.

The equalizing of exponents and shifting of the mantissas is accomplished during SC=4 condition of the sequence counter by the seven DP's through the following logic circuitry as shown in FIG. 4A. An AND circuit 114 senses by the high level of the DC≠20 line that the digit counter is not equal to 20. At the same time it senses AX>DX line to determine if this condition exists. If so, the output of the AND circuit 114 is high, which level is used to open the gate 32, permitting the D-register 28 to be shifted.

The output of the AND circuit 114 is used to effect a counting up of the exponent numbers stored in the DX register 101. To this end it should be noted that the two decades forming the DX register are arranged as decimal counters which can be either selectively counted up or counted down by input pulses applied through a gate 116. The countup or countdown condition is determined by respectively raising the level on countup input line 118 or the countdown input line 120. The decades of the AX register 107 are similarly arranged to count up or count down, as determined by the levels of the lines 118 and 120, by means of counting pulses passed by a gate 122. Since it is desired to count up the DX register 101, assuming the exponent in the DX register is smaller than that in the AX register, the output of the AND circuit 114 is used to raise the level of the countup line 118 and at the same time open the gate 116 through which DP and SP pulses are applied. Therefore each DP pulse from the seven DP's generated at this time steps up the counter formed by the DX register 101. This continues until the digit counter is returned to 20, following seven digit pulses, or until the DX register is counted up to equality with the AX register 107.

Assuming seven DP's are not enough to equalize the exponents, an AND circuit 124 senses when the digit counter 70 returns to 20 by the level of the DC=20 line and senses that the exponent in the AX register is still greater than the exponent in the DX register by the AX>DX line. Since under these circumstances, as discussed above, the mantissa in the A-register is the sum, the floating-point addition is substantially complete. The output of the AND circuit 124 is used to open the gate 111 for transferring the exponent numbers stored in the AX register back into the A1 and A2 decades of the A-register 38. Also a gate 125 on the output of the A-sign toggle 94 is biased open by the AND circuit 124 for transferring sign information stored in the AST toggle 94 back to the sign decade of the A-register 38. At the same time, a gate 126 is biased open to pass the next SP which is used as an operation-clear (OC) pulse to reset the computer and initiate the next fetch operation. The A-register 38 of course now stores the result of the floating-point addition.

It may be, however, that initially the exponent in the AX-register is smaller than that in the DX-register. This is sensed by an AND circuit 128 during the SC=4 condition of the sequence counter 68 and with the digit counter 70 set to 13. A resulting high level at the output of the AND circuit 128 opens the gate 42 permitting shifting of the A-register 38 by the DP's. At the same time, a high level is applied to the countup line 118 and the gate 122 whereby the DP's count up the AX-register. If at the end of the seven DP's, with the digit counter 70 returned to 20, the AX-register 107 has still not been increased to the same value as the DX-register 101, the mantissa stored in the D-register represents the sum. The exponents must be restored to the D-register and the operand shifted to the A-register 38 to complete the floating-point addition operation. To this end an AND gate circuit 130 senses that the AX<DX line is still at a high level, indicating that the exponent stored in the DX-register 101 is greater than that in the AX-register 107. The AND circuit 130 also senses that the digit counter 70 has returned to 20 and the DC=20 line is at a high level. The output of the AND circuit 130 opens the gate 105 permitting the exponents stored in the DX-register 101 to be transferred in parallel to the D1 and D2 decades of the D-register 28. At the same time the output of the AND circuit 130 sets the digit counter 70 to 8 so as to supply twelve DP's for the purpose of shifting the operand from the D-register through the adder to the A-register. The AND circuit 130 opens a gate 132 which passes a pulse to the SUT toggle 35 to assure that it is in the zero or add condition for the adder 34. Also the output of the AND circuit 132 is used to open a gate 134 by which the condition of the DST toggle 133 is transferred to the lowest order flip-flop of the D-sign decade of the D-register 28. The AND circuit 130 is also applied to the Set SC=9 input line to the setting matrix 73 whereby the sequence counter 68 is advanced from the count 4 condition to the count 9 condition. This permits all other logical operations which would otherwise be affected in the intermediate count conditions of the sequence counter 68 to be bypassed.

With the sequence counter in the count 9 condition, an AND circuit 135 senses the SC=9 condition and the DC≠20 line condition, and if both these conditions are true, produces a high level output. The output of the AND circuit 135 is applied to gates 32, 37, 40 and 42 by which the twelve DP's are used to shift both the D and A registers 28 and 38 and information is passed from the D10 decade of the D-register 28 through the Y-input of the adder 34 and from the Z-output of the adder 34 into the sign decade of the A-register 38.

After the twelve DP's required to shift the operands from the D-register 28 to the A-register 38, the digit counter 70 is returned to the count 20 condition. This is sensed by an AND circuit 136, opening a gate 138 which passes the next SP as an operation-clear (OC) pulse, indicating the end of the floating-point addition operation.

Returning to the operation of the computer during the time the sequence counter 68 is in the count 4 condition, assuming that neither exponent of the operand exceeds the exponent of the other operand by more than seven, the seven DP's generated during the equalizing and shifting process will produce equality between the DX register 101 and the AX register 107, which will be sensed by the comparison circuit 112. This results in the AX=DX line from the output of the comparison circuit 112 being raised to a high level potential. At the same time, the AX>DX line and the AX<DX line both will be at a low level potential, meaning that both the AND circuits 114 and 128 will produce a low level output, interrupting any further counting of either the DX-register 101 or the AX-register 107 and also interrupting any further shifting of the D-register 28 or the A-register 38.

Figure 4B:
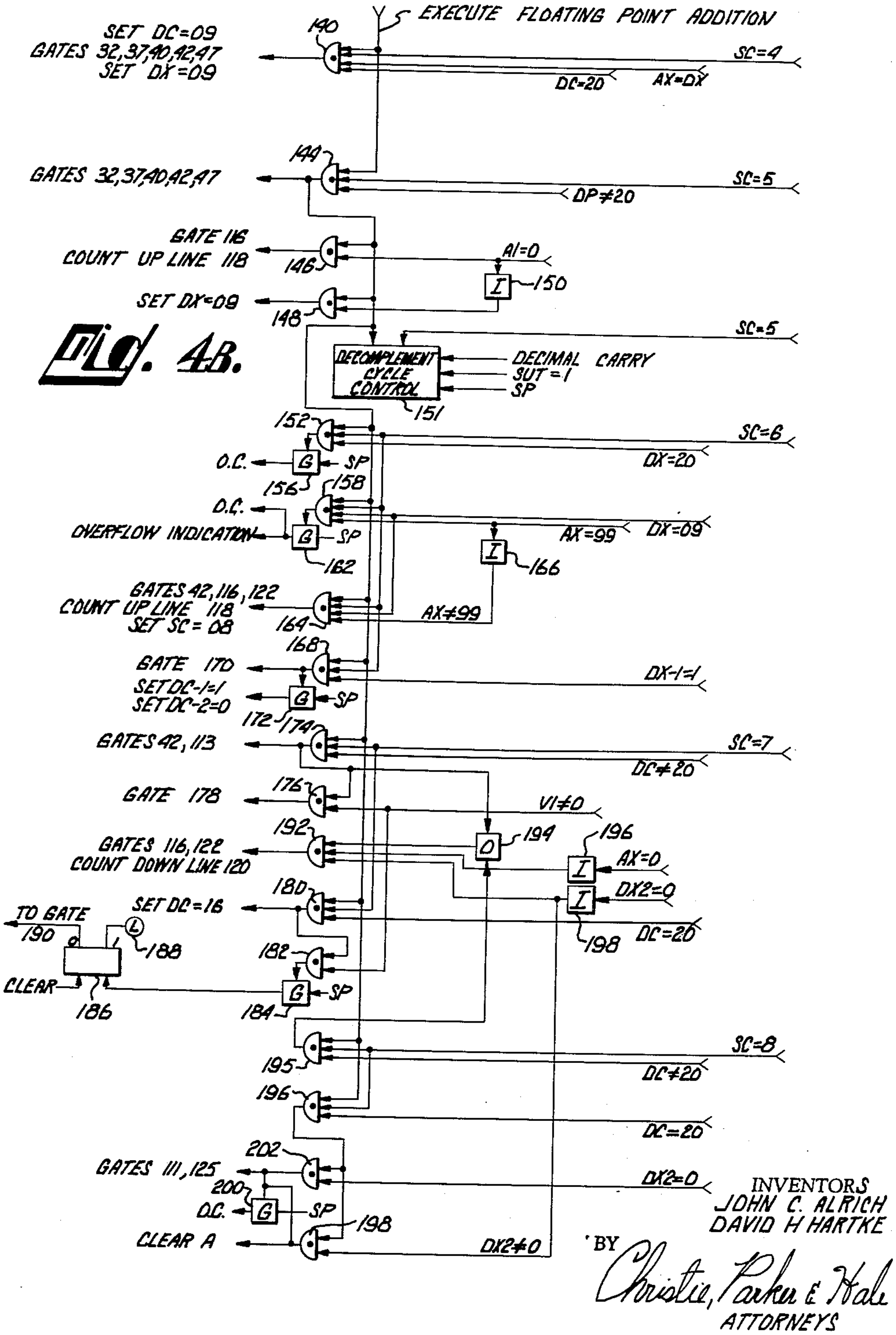

As shown in FIG. 4B, an AND circuit 140 senses during the SC=4 condition of the sequence counter 68 when equality is reached between the AX and DX registers, as determined by the high level of the AX=DX line. The output of the AND circuit 140 also senses that the digit counter 70 has been returned to 20 following the seven DP's, as determined by the high level of the DX=20 line. The output of the AND circuit 140 is applied to gates 32, 37, 40, 42 and 47 so that the next SP following the return of the digit counter 70 to 20 shifts the D-register 28 and A-register 38 one place. This shifts the least significant digit of the mantissa stored in the D-register from decade D10 to the Y-input of the adder 34 and at the same time shifts the least significant digit of the mantissa stored in the A-register 38 from the decade A10 to the X-input of the adder 34. The output of the AND circuit 140 is also applied to the Set DC=9 input of the setting matrix 80 for setting the digit counter to the count 9 condition. The output of the AND circuit 140 is also applied to a Set DX=9 on a similar setting matrix circuit 142 (see FIG. 3) connected to the flip-flops in the DX-register 101, whereby the next SP presets the DX-register to the count 9 condition.

The reasons for setting the DX-register to the count 9 condition is that the DX-register 101 is used as a tally register to indicate the number of significant zeros in the sum. As the sum is shifted through the A-register 38 by the following DP's generated by the setting of the digit counter 70, the digits passing through the A1 decade of the A-register 38 are examined. If the digit is a zero, the DX register is counted up once, but if the digit in the A1 decade is not zero, the DX register is set to the count 9 condition. Following the eleven DP's at the end of the add cycle, the DX register 101 indicates the number of significant zeros that have passed the A1 decade of the A-register 38. The DX-register 101 is initially set to 9 only as a matter of convenience in recognizing the contents of the DX-register later when the normalizing procedure is necessary, as explained in more detail hereinafter.

The sequence counter 68 is now advanced to the count 5 condition, and with the digit counter 70 set at 9, an AND circuit 144 senses that the $DC\neq 20$ line is high. During this time, in which DP's are being generated, the output of the AND circuit 144 opens the gates 32, 37, 40, 42 and 47. Thus the eleven DP's shift all the digits out of the D-register 28 and the A-register 38 to the Y and X inputs respectively of the adder 34 and shift the digit sums from the Z output back into the A-register 38. At the end of the eleven DP's, when the digit counter 70 is returned to the count 20 condition, the decades A2 through A10 contain the desired sum. At the same time, an AND circuit 146 connected to the output of the AND circuit 144 also senses whether the A1 decade is equal to zero by the high level of the A1=0 line from the decade A1. If so, the output of the AND circuit 146 is high, opening the gate 116 and permitting the DX-register 101 to be counted and at the same time the countup line 118 is raised to a high level. An AND circuit 148 also connected to the output of the AND circuit 144 senses when the A1 decade of the A-register 38 is not equal to zero by means of an inverter 150 connected to the A1=0 line. Thus when the decade A1 is not equal to zero the output of the AND circuit 146 is low and the output of the and circuit 148 is high. The output of the AND circuit 148 is applied to the set DX=9 input line of the setting matrix circuit 142 associated with the DX-register 101. See FIG. 3. Since the DX-register 101 is reset to 9 every time a non-zero digit passes the A1 decade in the A-register 38, at the end of the add cycle the difference between the final number registered in the DX-register and 9 indicates the number of significant zeros which have passed the A1 decade.

At the end of the add cycle, the digit counter 70 returns to 20 and an SP is emitted. If at this time there is a decimal carry from the adder 34 as a result of the addition and if the SUT toggle 35 indicates a subtraction operation, a decomplement cycle is initiated to get the proper algebraic sum into the A-register 38. The decomplement logic is indicated at 151. This decomplement cycle has been described in detail in the above-identified application. If no decomplement cycle is required, the sequence counter 68 is advanced to the SC=6 count condition in response to the emitted SP.

The following chart shows the possible conditions of the DX-register 101 after the above-described addition cycle is completed and the sequence counter advanced to the SC=6 condition. The chart also shows the number of left shifts necessary or the number of right shifts necessary in order to normalize the mantissa so that the most significant non-zero digit will occur in the A3 decade of the A-register 38.

| Significant Zeros Past A1 | DX1 | DX2 | AX | Left Shifts Necessary | Right Shifts Necessary |
|---|---|---|---|---|---|
| 0 | 0 | 9 | AX+1 | ---- | 1 |
| 1 | 1 | 0 | AX | ---- | ---- |
| 2 | 1 | 1 | AX−1 | 1 | ---- |
| 3 | 1 | 2 | AX−2 | 2 | ---- |
| 4 | 1 | 3 | AX−3 | 3 | ---- |
| 5 | 1 | 4 | AX−4 | 4 | ---- |
| 6 | 1 | 5 | AX−5 | 5 | ---- |
| 7 | 1 | 6 | AX−6 | 6 | ---- |
| 8 | 1 | 7 | AX−7 | 7 | ---- |
| 9 | 2 | 0 | ---- | ---- | ---- |

From the above chart it will be evident that if at the end of the add cycle, the DX-register 101 is equal to 20 the mantissa is all zeros. In this case the entire A-register is zero, which is by definition the proper sum, in which case the floating-point addition operation is complete. As shown in FIG. 4B, this condition is sensed by an AND circuit 152 during the SC=6 condition of the sequence counter 68. The AND circuit 152 senses when a DX=20 line is at a high potential. The DX=20 line is derived from a decoding matrix circuit 154, shown in FIG. 3, which senses the condition of the flip-flops in the DX-registor 101. If the count condition of the DX-register is equal to 20, then the DX=20 line from the decoding matrix 154 will be at a high level. The output of the AND circuit 152 opens a gate 156 which passes the next SP as an operation-clear (OC) pulse for setting the computer to the next operation.

It will be apparent further from the above chart that if the DX-register is equal to 9 at the end of the add cycle, a single right shift is required in order that the most significant non-zero digit be shifted from the A2 decade to the A3 decade and the remaining digits be shifted accordingly, with the digit in the least significant decade A10 being shifted out of the register. This is a normalizing process required to place the most significant non-zero digit in the A3 decade as required by the floating-point format.

This shift of course must be accompanied by an increase of one in the exponent which is presently stored in the AX-register 107. If the exponent is already 99 it cannot be counted up one more, which indicates an overflow condition. This is determined by an AND circuit 158 in the logical circuit as shown in FIG. 4B which senses that the DX-register 101 is equal to 9 and the AX-register is equal to 99. To this end it is connected to the DX=9 line from the decoding matrix circuit 154, which line is raised to a high level potential when the DX-register 101 is in the count 9 condition. Similarly a decoding matrix circuit 160 is connected to all the flip-flops in the decades comprising the AX-register 108. See FIG. 3. The AX=99 line and the DX=9 lines are both connected to the AND circuit 158 which in turn opens a gate 162 for passing an SP to a suitable alarm for an overflow indication and at the same time producing an OC to cause a fetch of the next instruction.

If the AX-register does not store a 99, it can be counted up one. This is achieved by an AND circuit 164 which is coupled through an inverter 166 to the AX=99 line from the matrix 160. The AND circuit 164 also senses that the DX-register 101 is in the count 9 condition by the DX=9 line. The output of the AND circuit 164 opens the gate 42 permitting the A-register to be shifted to the right once by the next SP. At the same time it energizes the countup line 118 so that the counters formed by the DX-register 101 and AX-register 107 are placed in the countup condition. It also opens the gates 116 and 122 whereby the DX- and AX-registers are counted up one. The counting up of the DX-register 101 plays no part in the exponent adjustment of course, but is counted up at this point only to satisfy a gating condition in a subsequent operation. The output from the AND circuit 164 is also used to set the sequence counter 68 to the count 8 condition so as to skip the SC=7 condition. All that remains to complete the operation in this event is to restore the exponent to the A1 and A2 decades in the A-register and to restore the sign in the sign decade of the A-register which is done as hereafter explained with the sequence counter 68 in the SC=8 condition.

Again referring to the above chart, if the DX-register 101 lies in the range between 10 and 17, which can be determined by sensing if the DX1–1 decade in the DX-register 101 is equal to 1, then the mantissa in the A-register must be anywhere from zero to seven places as determined by the digit in the DX2 decade. Since the A-register 38 can only be shifted right, it is necessary to shift right and recirculate in order to effect the equivalent of a left shift of the mantissa. Recirculation is provided by a gating circuit 113 as shown in FIG. 1, which couples the output of the A10 decade of the A-register 38 back to the A1 decade. Thus ten shifts provide complete circulation and the tens-complement of the number of right shifts equals the number of effective left shifts, i.e., nine right shifts moves the digit from the A10 decade, for example, through the gating circuit 113 and back into the A9 decade, corresponding to an effective left shift of one.

So the tens-complement of the digit in the DX2 decade of the DX-register 101 gives the proper number of recirculating right shifts necessary to accomplish the required number of effective left shifts indicated in the above chart. This is done by shifting the digits stored in the DX2 decade of the DX-register 101 to the DC2 decade of the digit counter 70. At the same time the DC1 decade is set to 1 so that the digit counter 70 in effect is set to 10 or greater. The number of DP's generated in returning the digit counter to the count 20 condition therefore is necessarily the tens-complement of the digit stored in the DX2 decade and therefore is the proper number of DP's required to effect the right shift and circulate to effect the number of necessary left shifts as set forth in the chart above.

This operation is accomplished in the logic circuit as shown in FIG. 4B by an AND circuit 168 which senses during the SC=6 count condition of the sequence counter 68 whether the DX1–1 flip-flop of the DX-register 101 is equal to one. If so the AND circuit 168 produces a high level output. The AND circuit 168 biases open the gate 170 (see FIG. 2) by which the digit stored in the DX2 decade of the DX-register 101 is transferred to the DX2 decade of the digit counter 70. At the same time the AND circuit 168 opens the gate 170 which passes the next SP to set the DX1–1 flip-flop in the digit counter 70 to the binary one condition and set the DX1–2 flip-flop of the digit counter 70 to the binary zero condition, thus forcing a binary digit one in the higher order partial decade of the digit counter 70. At the same time the sequence counter 68 is advanced to the SC=7 condition.

It is during the SC=7 time that the left shift normalizing of the mantissa in the A-register 38 is effected. Also, it is during this time that the number of left shifts is compared with the desired precision and if the number of significant digits lost by the normalizing is in excess of the desired precision, the computer is halted at the end of the floating-point addition operation. According to the novel aspects of the present invention, the floating-point addition instruction contains a precision digit which is stored in the most significant digit position of the instruction word. Thus when the instruction is positioned in the C-register 50, the precision digit is stored in the first variant decade designated V1, as shown in FIG. 1. The number established in the instruction by the programmer designates the digits which may be lost in the normalizing process, i.e., the maximum number of left shifts that can be tolerated in the algebraic addition operation.

Referring again to the logic circuit of FIG. 4B, an AND circuit 174 senses that the digit counter 70 is in the DC≠20 condition during the SC=7 count condition of the sequence counter.

The output from the AND circuit 174 opens gate 42 to provide shifting of the A-register and opens gate 113 to provide recirculation from the A10 decade back to the A1 decade of the A-register 38. The output of the AND circuit 174 is also connected to an AND circuit 176 which senses whether or not the V1 decade is equal to zero.

It should be noted at this point that the V1 decade of the C-register 50 is arranged as a decimal counter which is counted up in response to pulses applied through a gate 178 as shown in FIG. 1.

The output of the AND circuit 176 is applied to the gate 178, causing the variant decade V1 to be counted up through nine and back to zero. As pointed out above, the tens-complement of the required number of left shifts for normalization is equal to the number of right shifts required with circulation of the A-register. By the same token, the tens-complement of the number stored in the variant decade V1 is equal to the maximum permissible number of recirculated right shifts in order to effect the maximum number of left shifts indicated by the digit stored in the variant decade V1. Therefore when the variant decade V1 is counted up until it returns to zero, the maximum number of allowable left shifts has taken place in the A-register 38, as specified by the precision digit stored in the V1 position of the instruction stored in the C-register 50.

Assuming that the required number of left shifts is greater than the value of the precision digit stored in the variant decade V1, decade V1 is returned to zero before the shifting of the A-register 38 is completed. At this time the gate 178 is closed, since the V1≠0 line, as derived at the output of an OR circuit 179 connected to the four flip-flops of the decade V1, is no longer at a high level potential.

Since the number of DP's as determined by the setting of the digit counter 70 is equal to the tens-complement of the number of left shifts required for normalization of the mantissa in the A-register 38, if the number of left shifts required for normalization is greater than the number specified by the precision digit stored in the variant decade V1, there are not sufficient DP's to count the decade V1 up through nine and back to zero. Thus if the variant decade V1 is not zero when the next SP is generated following the return of the digit counter 70 to the count 20 condition, an alarm is sounded and the computer is set to cease operation at the completion of the instruction. This is provided in the logic circuit of FIG. 4B by an AND circuit 180 which senses when the digit counter returns to 20 and an AND circuit 182 which senses when the output of the AND circuit 180 goes to a high level and senses that the V1 decade is not zero as determined by the high level of the V1≠0 line. The AND circuit 182 opens a gate 184 which passes the next SP to a flip-flop 186, changing it from the normal zero state to the one state. The flip-flop 186 controls an alarm which may be in the form of a panel light or an audio device indicated generally at 188. At the same time it closes a gate 190, as shown in FIG. 4A, inhibiting the complementing of the Execute toggle 86 by the next OC pulse generated at the end of the floating-point operation.

In addition to shifting of the mantissa to normalize the result in the A-register 38, the exponent stored in the AX-register 107 must be adjusted accordingly. The left shift requires that the exponent be reduced, meaning that the AX-register 107 must be counted down during the left-shift normalizing procedure. This is done during the time the sequence counter is in the SC=7 condition by an AND circuit 192 as shown in the logic circuit of FIG. 4B. The AND circuit 192 senses the output of the AND circuit 174 through an OR circuit 194. At the same time the AND circuit 192 determines that the AX-register 107 is not equal to zero by an inverter circuit 196 connected to the AX=0 line from the decoding matrix 160, shown in FIG. 3. It also senses that the DX2 decade of the DX-register 101 is not equal to zero by means of an inverter 198 connected to the DX2=0 line from the decoding matrix circuit 154 shown in FIG. 3. The AX-register 107 must not be zero at this time because an underflow would occur if it were counted down after reaching zero.

The output of the AND circuit 192 opens the gates 116 and 122 to permit counting of the DX-register 101 and the AX-register 107 and also is applied to the count-down line 120 to cause countdown of the DX and AX registers. It will be seen that this continues until one of three things happen; the digit counter 70 reaches 20, the DX2 decade reaches zero, or the AX-register 107 is counted down to zero. When the DX2 decade reaches zero, the exponent stored in the AX-register 107 has been properly adjusted.

By the time the digit counter 70 is returned to 20 of course the mantissa is properly shifted but there may not have been enough pulses to count the DX2 register down to zero, so that additional pulses are required. These pulses are supplied by setting the digit counter to 16 in response to the output of the AND circuit 180. When the sequence counter 68 is advanced to the SC=8 condition, four additional DP's are available to continue the count-down of the DX and AX registers. To this end an AND circuit 195 is provided which senses that the sequence counter 68 is in the SC=8 condition and that the digit counter 70 is not equal to 20. The output of the AND circuit 195 is coupled to the AND circuit 192 through the OR circuit 194 thereby continuing the count-down of the DX and AX registers until one of them reaches zero. Of course if the AX-register 107 is counted down to zero before the DX2 decade reaches zero, an underflow condition exists. This condition is sensed by an AND circuit 196 which produces a high level output when the digit counter is returned to the DC=20 condition. The output of the AND circuit 196 is applied to an AND circuit 198 which also senses that the DX2 decade is still not equal to zero. The AND circuit 198 then opens a gate 200 which passes the next SP as an operation-clear (OC) pulse, and at the same time clears the A-register 38 as required by the underflow condition.

However, if the decade DX2 has returned to zero, the exponent in the AX-register 107 has been fully adjusted and must be transferred to the A1 and A2 decades of the A-register 38 and the sign decade of the A-register must be properly set. This is accomplished by an AND circuit 202 connected to the output of the AND circuit 196, and also connected to the DX2=0 line from the setting matrix circuit 154. This opens the gate 111 as shown in FIG. 1, permitting parallel transfer from the AX register to the A1 and A2 decades of the A-register 38. At the same time it opens the gate 125 on the output of the AST toggle 94, as shown in FIG. 4A. If the toggle 94 has been storing a negative sign, it is in the binary one condition. When the gate 125 is open, this sets the ASG–1 flip-flop of the sign decade ASG in the A-register 38 to the one condition thereby transferring the negative sign to the A-register. The output of the AND circuit 198 is also applied to the gate 200 to produce an OC in response to the SP generated when the digit counter 70 returns to 20. The OC indicates the next fetch operation.

It is evident from the above detailed description that means is provided in the form of a counter in the command register for maintaining a predetermined accuracy in the mantissa of the operand for floating-point addition. The counter is preset with each instruction as required and the counter counts the number of left shifts required to normalize the operand in floating-point notation at completion of the addition operation. If normalizing results in an excess loss of significant places in the mantissa, operation is stopped. The programmer can then modify the program in a different mathematical manner to preserve the required accuracy demanded by the problem.

While the technique has been particularly described in a preferred embodiment, it applies to any digital computer which normalizes its answer after an addition or subtraction, as is most often done when floating-point operations are performed. It applies whether the computer be a serial, serial-parallel, or a parallel type; whether it be coded in binary, binary-coded decimal, or biquinary; single or multiple address. The invention can be applied to any such computers at no loss in operating speed and with relatively little additional equipment and cost.

What is claimed is:

1. A computer for performing floating-point computations in which the normalized precision is preset to any desired number of significant digits, the computer including first and second registers for storing operands, a first group of digits in each register representing an exponent to the base ten and a second group of digits representing a mantissa, the decimal point being assumed to be at the left of the mantissa, a third register for storing an instruction, at least one digit in the instruction indicating the precision required in the mantissa in normalizing the resulting mantissa following an algebraic addition operation, arithmetic means for adding the mantissa of the operands and shifting the resultant sum into the first register, normalizing means for shifting the digits of the resulting mantissa in the first register a number of times in the register equal to the number of significant zero digits to the left of the most significant non-zero digit occurring in the resulting mantissa, a counter for storing the precision digit of the instruction, the counter being advanced in synchronism with the shifting of the resulting mantissa in the first register, and means responsive to a predetermined count condition of the counter for inhibiting any subsequent operation of the computer and indicating a loss of precision.

2. A computer for performing floating-point computations in which the normalized precision is preset to any desired number of significant digits, the computer including first and second registers for storing operands, a first group of digits in each register representing an exponent to the base ten and a second group of digits representing a mantissa, a third register for storing an instruction, at least one digit in the instruction indicating the precision required in the mantissa in normalizing the resulting mantissa following an algebraic addition operation, arithmetic means for adding the mantissas of the operands, register means for storing the resulting mantissa produced by the summation of the mantissas of the operands, normalizing means for shifting the digits of the resulting mantissa in the register means a number of times in the register equal to the number of significant zero digits occurring in the resulting maintissa, a counter for storing said one digit of the instruction, the counter being advanced in synchronism with the shifting of the resulting mantissa, and means responsive to a predetermined count condition of the counter for inhibiting any subsequent operation of the computer and indicating a loss of precision.

3. A computer for performing floating-point computations in which the normalized precision is preset to any desired number of significant digits, the computer including first and second registers for storing operands, a first group of digits in each register representing an exponent to the base ten and a second group of digits representing a mantissa, a third register for storing an instruction, at least one digit in the instruction indicating the precision required in the mantissa in normalizing the resulting mantissa following an algebraic addition operation, arithmetic means for adding the mantissas of the operands, register means for storing the resulting mantissa produced by the summation of the mantissas of the operands, normalizing means for shifting the digits of the resulting mantissa in the register means a number of times in the register equal to the number of significant zero digits occuring in the resulting mantisa, and means for indicating when the number of shifts of the register by the normalizing means exceeds the number established by the precision digits of the instruction.

4. A digital computer for performing algebraic addition in floating-point notation in which the operands include a first group of digits representing a mantissa and a second group of digits representing an exponent, the most significant digit position of the mantissa always containing a non-zero digit, the computer comprising a command register for storing a floating-point addition instruction as a group of digits in electrically coded form, the instruction including at least one precision digit indicative of the minimum number of significant non-zero digits required in the mantissa resulting from an algebraic addition of the operands, means for storing the operands, means responsive to the floating-point instruction in the command register for equalizing the exponents of the operands and inserting significant zeros in the mantissa of one of the operands according to the difference in the exponents of the operands, means responsive to the floating-point instruction in the command register for producing the algebraic sum of the mantissas of the operands, an accumulator register for storing the mantissa resulting from the algebraic summation, normalizing means for shifting the accumulator register to position the most significant non-zero digit of the mantissa resulting from the algebraic summation in the most significant digit position of the accumulator register, a counter for storing the precision digit of the floating-point addition instruction, means for stepping the counter a number of times determined by the number of shifts of the accumulator register by the normalizing means, and means responsive to the counter when stepped to a predetermined count condition for modifying the operation of the computer.

5. A digital computer for performing algebraic addition in floating-point notation in which the operands include a first group of digits representing a mantissa and a second group of digits representing an exponent, the most significant digit position of the mantissa always containing a non-zero digit, the computer comprising a command register for storing a floating-point instruction as a group of digits in electrically coded form, the instruction including at least one precision digit indicative of the minimum number of significant non-zero digits required in the mantissa resulting from an algebraic addition of the operands, means for storing the operands, means responsive to the floating-point instruction in the command register for equalizing the exponents of the operands and inserting significant zeros in the mantissa of one of the operands according to the difference in the exponents of the operands, means responsive to the floating-point instruction in the command register for producing the algebraic sum of the mantissas of the operands, an accumulator register for storing the mantissa resulting from the algebraic summation, normalizing means for shifting the accumulator register to position the most significant non-zero digit of the mantissa resulting from the algebraic summation in the most significant digit position of the accumulator register, a counter for storing the precision digit of the floating-point instruction, means for stepping the counter a number of times determined by the number of shifts of the accumulator register by the normalizing means, and means responsive to the counter when stepped to a predetermined count condition for indicating that the number of shifts of the accumulator register has exceeded a predetermined amount as established by the initial setting of the counter.

6. A digital computer for performing algebraic addition in floating-point notation in which the operands include a first group of digits representing a mantissa and a second group of digits representing an exponent, the most significant digit position of the mantissa always containing a non-zero digit, the computer comprising a command register for storing a floating-point instruction as a group of digits in electrically coded form, the instruction including at least one precision digit indicative of the minimum number of significant non-zero digits required in the mantissa resulting from an algebraic addition of the operands, means for storing the operands, means responsive to the floating-point instruction in the command register for equalizing the exponents of the operands and inserting significant zeros in the mantissa of one of the operands according to the difference in the exponents of the operands, means responsive to the floating-point instruction in the command register for producing the algebraic sum of the mantissas of the operands, an accumulator register for storing the mantissa resulting from the algebraic summation, normalizing means for shifting the accumulator register to position the most significant non-zero digit of the mantissa resulting from the algebraic summation in the most significant digit position of the accumulator register, and means responsive to the shifting of the accumulator register by the normalizing means for indicating when the number of shifts exceeds the amount established by the precision digit of the instruction stored in the command register.

7. In a digital computer for performing algebraic addition in floating-point notation in which operands include a first group of digits representing a mantissa and a second group of digits representing an exponent, apparatus for monitoring the precision of the mantissa to insure a predetermined number of significant digits at the completion of the floating-point operation, said apparatus comprising means for storing first and second operands, means for adding algebraically the mantissas of the operands, a register for storing the resulting mantissa of the algebraic addition of the mantissas of the operands, means for storing the exponent digits of the operands, means for shifting the resulting mantissa in the register to shift out the significant zeros ahead of the first non-zero digit, means for modifying the exponent digits in the exponent storing means in accordance with the number of significant zeros shifted out of the resulting mantissa, and settable means responsive to the shifting means for indicating when the number of shifts of the resulting mantissa exceeds a predetermined set number.

8. In a computer for performing arithmetic operations on operands having a floating-point format in which two groups of fixed numbers of digits in the operands represent the mantissa and exponent respectively of the particular operand, apparatus for monitoring the precision of the mantissa at the completion of a floating-point arithmetic operation comprising a register for storing the mantissa resulting from an arithmetic operation of two operands, means for storing the exponent resulting from the arithmetic operation of the two operands, means for normalizing the resulting mantissa in the register by shifting the most significant non-zero digit to a predetermined position in the register and modifying the exponent by the amount of shifts required, means for storing a precision digit indicative of the minimum allowable number of significant digits in the mantissa stored in the register after shifting of the register by the normalizing means, and means for indicating when the number of significant digits remaining in the register during the shifting operation is less than the minimum allowable number established by the stored precision digit.

References Cited in the file of this patent

UNITED STATES PATENTS 2,538,636 Williams -------------- Jan. 16, 1951

FOREIGN PATENTS 749,836 Great Britain ----------- June 6, 1956

OTHER REFERENCES

Wilkes et al.: Programs for An Electronic Digital Computer (1957), Addison-Wesley Publishing Co., Inc., Reading, Mass., pg. 91 relied on.